(12) United States Patent
Giefer et al.

(10) Patent No.: US 6,688,448 B2
(45) Date of Patent: Feb. 10, 2004

(54) DEVICE FOR SHIFTING IN A MECHANICAL SHIFTING ELEMENT BETWEEN A FIRST SHIFTING STATE AND AT LEAST A SECOND SHIFTING STATE

(75) Inventors: Andreas Giefer, Lemförde (DE); Jörg Meyer, Wagenfeld (DE); Reimund Börgerding, Steinfeld (DE); Ludger Rake, Diepholz (DE)

(73) Assignee: ZF Lemförder Metallwaren AG, Dielingen (DE)

( * ) Notice: Subject to any disclaimer, the term of this patent is extended or adjusted under 35 U.S.C. 154(b) by 0 days.

(21) Appl. No.: 10/111,720
(22) PCT Filed: Sep. 5, 2001
(86) PCT No.: PCT/DE01/03385
§ 371 (c)(1),
(2), (4) Date: Apr. 25, 2002
(87) PCT Pub. No.: WO02/21022
PCT Pub. Date: Mar. 14, 2002

(65) Prior Publication Data

US 2002/0148318 A1 Oct. 17, 2002

(30) Foreign Application Priority Data

Sep. 6, 2000 (DE) .......................................... 100 44 159

(51) Int. Cl.$^7$ ........................... F16H 61/32; B60T 7/00; B60K 41/26
(52) U.S. Cl. .................... 192/219.4; 74/335; 74/473.12
(58) Field of Search .............................. 192/218, 219.4, 192/222, 226, 84.92, 90; 188/71.2; 477/13; 74/335, 473.12, 473.18, 473.3

(56) References Cited

U.S. PATENT DOCUMENTS 3,400,797 A * 9/1968 Horn et al. ................... 192/90

(List continued on next page.)

FOREIGN PATENT DOCUMENTS

| DE | 198 34 156 | 2/2000 |
|----|-----------|--------|
| EP | 0 527 389 | 2/1993 |
| EP | 0 757 193 | 2/1997 |
| JP | 61-207258 | 9/1986 |
| JP | 6-193729 A * | 7/1994 |
| JP | 7-277156 | 10/1995 |

OTHER PUBLICATIONS

Patent Abstracts of Japan vol. 1996, No. 02, Feb. 29, 1996.

Patent Abstracts of Japan vol. 011, No. 044, Feb. 10, 1987.

Primary Examiner—Rodney H. Bonck
(74) Attorney, Agent, or Firm—McGlew & Tuttle, P.C.

(57) ABSTRACT

A device is provided for shifting a mechanical shifter between a first shifting state and at least one second shifting state, especially for engaging and disengaging a parking brake for an automatic transmission. An adjusting member (4) is coupled with the shifter for shifting between the shifting states. A control member (5) is provided that can be coupled with the adjusting member (4). A coupling device (5, 6, 7, 12) can be actuated by an electric signal By this coupling device (5, 6, 7, 12) the adjusting member (4) and the control member (5) can be coupled with one another. The coupling device (5, 6, 7, 12) is designed such that the adjusting member (4) and the control member (5) are uncoupled from one another in case of loss of the electric signal. A drive (8, 9, 10, 11) is coupled with the control member (5) for driving the control member (5). A spring (13), is provided for shifting the shifter into the first shifting state in which it is coupled with the adjusting member (4) and an abutment (14) and is tensioned in relation to the adjusting member (4) and in the second shifting state such that the shifter is shifted into the first shifting state by the spring (13) via the adjusting member (4) in the uncoupled state.

18 Claims, 6 Drawing Sheets

U.S. PATENT DOCUMENTS

| | | | |
|---|---|---|---|
| 4,291,586 A | | 9/1981 | Buetemeister |
| 4,805,472 A | * | 2/1989 | Aoki et al. .................... 74/335 |
| RE34,064 E | * | 9/1992 | Tury et al. .................... 74/335 |
| 5,180,038 A | * | 1/1993 | Arnold et al. ........... 192/219.4 |
| 5,601,162 A | * | 2/1997 | Heimann ................. 192/219.4 |
| 5,620,077 A | * | 4/1997 | Richard ...................... 192/226 |
| 5,827,149 A | * | 10/1998 | Sponable ..................... 477/92 |
| 5,901,608 A | * | 5/1999 | Takeyama .................... 74/335 |
| 6,016,717 A | * | 1/2000 | Wheeler .................. 74/473.12 |
| 6,237,737 B1 | * | 5/2001 | Jorgensen et al. ....... 192/84.92 |
| 6,315,073 B1 | * | 11/2001 | Nonaka ....................... 74/335 |
| 6,332,257 B1 | * | 12/2001 | Reed et al. ................... 74/335 |

* cited by examiner

DEVICE FOR SHIFTING IN A MECHANICAL SHIFTING ELEMENT BETWEEN A FIRST SHIFTING STATE AND AT LEAST A SECOND SHIFTING STATE

FIELD OF THE INVENTION

The present invention pertains to a device for shifting a mechanical shifting device between a first shifting state and at least one second shifting state, especially for engaging and disengaging a parking brake for an automatic transmission.

BACKGROUND OF THE INVENTION

Automatic transmissions with a mechanical parking brake have been known from the state of the art. At least four modes of operation, which correspond to the following shift positions of a gearshift lever, namely, "P," "R," "N" and "D," are usually associated with a conventional automatic transmission for motor vehicles. In the individual shift positions, "P" designates the state "Parking," in which the transmission is usually blocked mechanically against the transmission of movements by the parking brake. "R" designates the "reverse movement," "D" designates the "forward movement," and the shift position "N" corresponds to the "neutral operation," in which there is no mechanical coupling between the engine and the wheels.

A usual safety requirement is that the mechanical parking brake of the automatic transmission can always be engaged or is always engaged with the vehicle not moving.

This safety requirement can be satisfied relatively easily with an automatic shifting, in which a mechanical transmission member, e.g., a gearshift cable or a gearshift linkage, is provided between the gearshift lever and the automatic transmission, because a coupling is forced to take place between the actual shifting state of the transmission and the indicated shifting state of the gearshift lever because of the mechanical transmission member, at any rate as long as the mechanical transmission member is not defective. The gearshift lever can be brought into the shift position "P" and the automatic transmission can be shifted via the mechanical coupling into the corresponding state with the parking brake engaged even in case of a power failure in the vehicle.

However, electromechanical transmission members have recently been developed for the automatic shifting, wherein a mechanical coupling between the automatic transmission and the gearshift lever is no longer present. The shifting states of the gearshift lever are detected electronically in this case and are sent in the form of electric signals associated with the shifting states to a device (transmission actuator mechanism), which brings the automatic transmission into the mode of operation corresponding to the shift position of the gearshift lever instead of the mechanical transmission member. Such an electromechanical shifting operation is also called "shift by wire" in English.

However, it is possible with the electromechanical coupling between the gearshift lever and the automatic transmission that in the case of a power failure in the vehicle, a different mode of operation is set for the transmission than is indicated by the gearshift lever, because the gearshift lever can be actuated independently from the transmission actuator mechanism. However, the above-mentioned safety requirement can thus no longer be satisfied in all cases.

SUMMARY OF THE INVENTION

The basic object of the present invention is to provide a device with which the above-mentioned safety requirement for an automatic transmission can be satisfied even in case of the use of an electromechanical transmission member.

The device according to the present invention for shifting the gears of a mechanical shifting device between a first shifting state and at least one second shifting state has an adjusting member coupled with the shifting device shifting between the shifting states, wherein the adjusting member can be coupled with a control member via a coupling device.

A certain position of the adjusting member is associated with each shifting state of the shifting device, so that the shifting device can be shifted into any desired shifting state from the first shifting state and from the at least one second shifting state by the adjusting member being brought into the position associated with the desired shifting state. A change in the position of the adjusting member may be brought about, e.g., by displacement, rotation or pivoting.

In the coupled state, the adjusting member can be driven or actuated by the control member, and the control member itself is actuated or driven by a drive device. The adjusting member can consequently be brought into the different positions associated with the shifting states by driving the control member. A certain position of the control member, into which this control member can be brought by means of the drive means, is in turn associated for this with each of the aforementioned positions of the adjusting member.

The coupling device can be actuated by means of an electric signal, i.e., the adjusting member is coupled with the control member by this coupling device when the electric signal assumes a certain state. It may be nearly any state as long as it is ensured that it differs from the signal state occurring in case of loss of the electric signal, e.g., a power failure. In case of loss of the electric signal, the coupling between the adjusting member and the control member is then released by the coupling device, so that these two members are again uncoupled from one another.

For the reliable resetting of the shifting device into the first shifting state in case of loss of the electric signal, a spring means is coupled with the adjusting member and with an abutment, the spring means being tensioned in each shifting state that is different from the first shifting state in relation to the adjusting member such that in case of an uncoupling between the adjusting member and the control member, the adjusting member is shifted by the spring means into the position associated with the first shifting state while the tension of the spring means decreases, as a result of which the shifting device is also shifted into the first shifting state. Since the spring means is coupled with the adjusting member and the abutment, the tension of the spring means that is necessary for the resetting of the adjusting member into the position associated with the first shifting state can be built up by a change in the relative position between the adjusting member and the abutment or by a relative movement of the adjusting member and the abutment.

The device according to the present invention may be used wherever a certain shifting state of at least two shifting states of a mechanical shifting device shall be engaged with certainty in case of a power failure. However, the device according to the present invention is preferably used to engage and disengage a parking brake of an automatic transmission. The shifting device is now designed as the parking brake of the automatic transmission, where the first shifting state corresponds to the state of the engaged parking brake and the at least one second shifting state corresponds to the state of the disengaged parking brake.

The adjusting member may be coupled with the shifting device with a common lever mechanism. However, the adjusting member is preferably coupled with the shifting device via a shaft, in which case the shifting device is shifted by a rotary movement of the shaft between the first and at least one second shifting states. The adjusting member is connected to the shaft, rotating with it in unison in this case.

In the coupled state, the control member may transmit a translatory movement, which can be converted at the adjusting member into a rotating movement for shifting between the different states. However, the control member is preferably mounted rotatably in relation to the shaft, in which case the adjusting member and the control member are connected to one another rotating in unison in the coupled state. The shaft can thus be rotated by a rotary movement of the control member in the coupled state via the adjusting member for shifting the shifting device between the shifting states.

The coupled state of the adjusting member and the control member may be embodied by means of a common positive-locking and non-positive connection. For example, the coupled state may be embodied according to the principle of a friction clutch, in which case the adjusting member, the control member and the coupling device are designed according to the design of such a friction coupling. However, the adjusting member and the control member are preferably designed such that a toothed brake (jaw clutch) is formed by these two members.

To form a jaw clutch, both the adjusting member and the control member are designed as disks, whose surfaces located opposite each other are provided with a plurality of teeth each. The adjusting member and the control member are held against one another in the coupled state by a coupling force applied by the coupling device, with the teeth of the control member engaging the spaces between the teeth of the adjusting member and vice versa. The teeth of the adjusting member are now in functional connection with the teeth of the control member, as a result of which a connection rotating in unison is established between the control member and the adjusting member as long as the coupling force is maintained by the coupling device. Furthermore, the geometric design of the teeth is such that a releasing force, which pushes the control member and the adjusting member apart, acts on the two members during the transmission of a torque from the adjusting member to the control member or vice versa. If the coupled state between the adjusting member and the control member shall be maintained, the amount of the coupling force must therefore always be greater than or at least equal to the amount of the releasing force. When the coupling force is eliminated and a torque is transmitted at the same time from the adjusting member to the control member or vice versa, the control member and the adjusting member are moved apart relative to one another until the teeth cease to engage the tooth spaces. The jaw coupling thus has the advantage that the IBM connection rotating in unison between the adjusting member and the control member is automatically released when the two members are no longer held in contact with one another by the coupling force. The jaw coupling is preferably designed such that the control member is moved away from the adjusting member due to the releasing force.

The spring means may be formed by any mechanical spring that is suitable for resetting the shifting device located in the at least one second shifting state into the first shifting state in the uncoupled state. However, the spring means is preferably a coil spring, leg spring or helically wound spiral spring fastened to the adjusting member and the abutment, in which case the resetting of the shifting device into the first shifting state takes place by the connection rotating in unison between the adjusting member and the shaft.

To guarantee reliable resetting of the shifting device into the first shifting state, the spring means must have a certain resetting tension in the second shifting state. It may be necessary for this to provide a certain minimum pretension for the spring means already in the first shifting state.

The spring means is coupled with the adjusting member and with the abutment, the abutment being provided according to a first alternative at the automatic transmission or at a site that is stationary relative to the automatic transmission. If the adjusting member is brought into the position associated with the second shifting state, e.g., by a rotary movement to shift into the second shifting state, the spring means is tensioned up to the resetting tension at the same time.

However, the consequence of the arrangement of the abutment according to the first alternative is that the work needed to tension the spring means must be performed each time when shifting from the first shifting state into the second shifting state takes place. Furthermore, the work to be performed for shifting becomes greater and greater the farther the adjusting member must be moved or rotated for this. This effect may be undesired in some types of application of the device according to the present invention.

The abutment is therefore provided at the control member according to a second alternative. In this case, the control member is pretensioned in relation to the adjusting member in the uncoupled state up to the resetting tension. The adjusting member and the control member are coupled with one another via the coupling device only thereafter. It is therefore no longer necessary to perform work for tensioning the spring means in the coupled state during the shifting from the first shifting state into the at least one second shifting state, because there is no relative movement between the adjusting member and the control member or the abutment. The tension of the spring means is set constantly at the resetting tension in the coupled state, so that the tension of the spring means according to the second alternative is constant in each shifting state. In order for the adjusting member to be able to reset by the spring means into the position associated with the first shifting state in the uncoupled state, the control member must be fixed during the resetting operation in relation to the adjusting member, so that the spring means can relax or reduce its tension only by the resetting of the adjusting member. This fixation of the control member may take place, e.g., by the control member being driven by the drive means via a transmission with self-locking, such as a worm gear.

The coupling device has the task of coupling the control member and the adjusting member with one another. To perform this task, the control device may be moved, e.g., by the coupling device toward the adjusting member to establish a mechanical contact, and the coupling device applies a coupling force by which the adjusting member and the control member are brought into contact with one another and are held in contact with one another. Furthermore, the coupling between the adjusting member and the control member shall again be released by the coupling device under certain conditions. This can be achieved, e.g., by the coupling device not applying any coupling force on the control member or on the adjusting member any longer in the uncoupled state. The coupling device may be designed such that the control member is moved away from the adjusting member or vice versa by the coupling device to assume the uncoupled state.

The coupling device may have, e.g., a pneumatic, hydraulic or electrostatic design. However, the coupling device preferably has a magnetic design, in which case the coupling device has a magnetizable area each at both the adjusting member and the control member, and at least one of the magnetizable areas is formed by an electromagnet that can be activated by the electric signal.

According to a simple embodiment of this preferred magnetic coupling device, the electromagnet is arranged at the adjusting member and the magnetizable area made of ferromagnetic material is arranged at the control member. When an electric current forming the electric signal is flowing through the electromagnet, the magnetic field generated by the electromagnet cooperates with the ferromagnetic area at the control member such that the control member is pulled by the electromagnet. The pulling force generated by the activated electromagnet in cooperation with the ferromagnetic area, acting as a coupling force, causes the control member and the adjusting member to be brought into contact with one another and to be firmly held together. If the electric current fails for any reason, the magnetic field of the electromagnet also collapses, and no coupling force is generated any longer to hold together the adjusting member and the control member.

It is, of course, also possible to arrange the electromagnet at the control member and the ferromagnetic area at the adjusting member. Furthermore, the ferromagnetic area may also be replaced by a second magnet, especially a second electromagnet.

If the device according to the present invention is integrated within a larger system comprising a plurality of components with a system control, the failure of individual components of the system is possible without the electric signal failing. Nevertheless, it may be important for safety reasons for the shifting device to be shifted in such situations into the first shifting state. The signal state can for this reason also be brought about by the system control in a controlled manner by the electric signal being brought by the system control into the state that it assumes in the case of its failure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
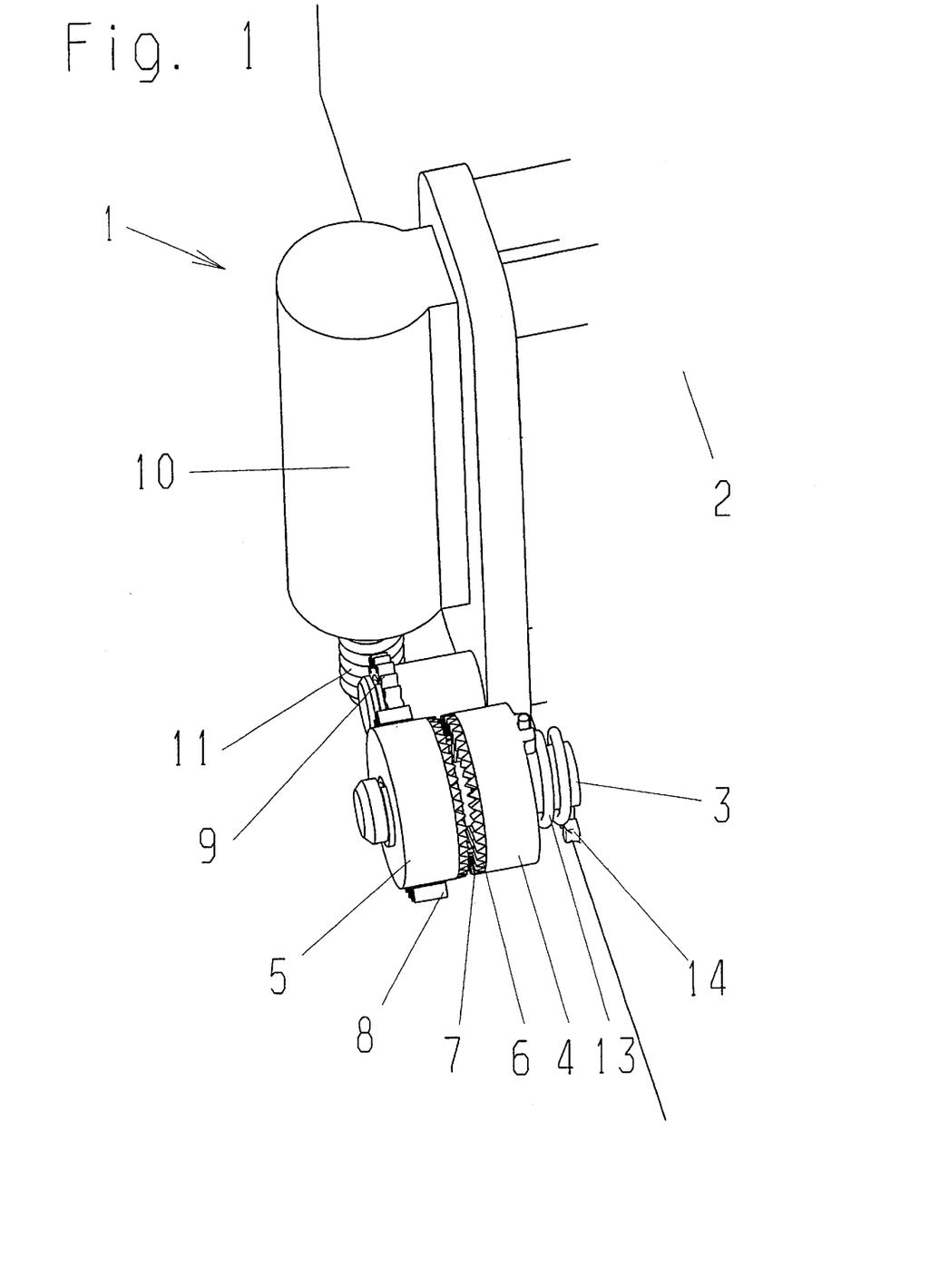
FIG. 1 is a perspective view of the device according to the present invention for shifting a mechanical shifting device according to a first embodiment in the uncoupled state.
Figure 2:
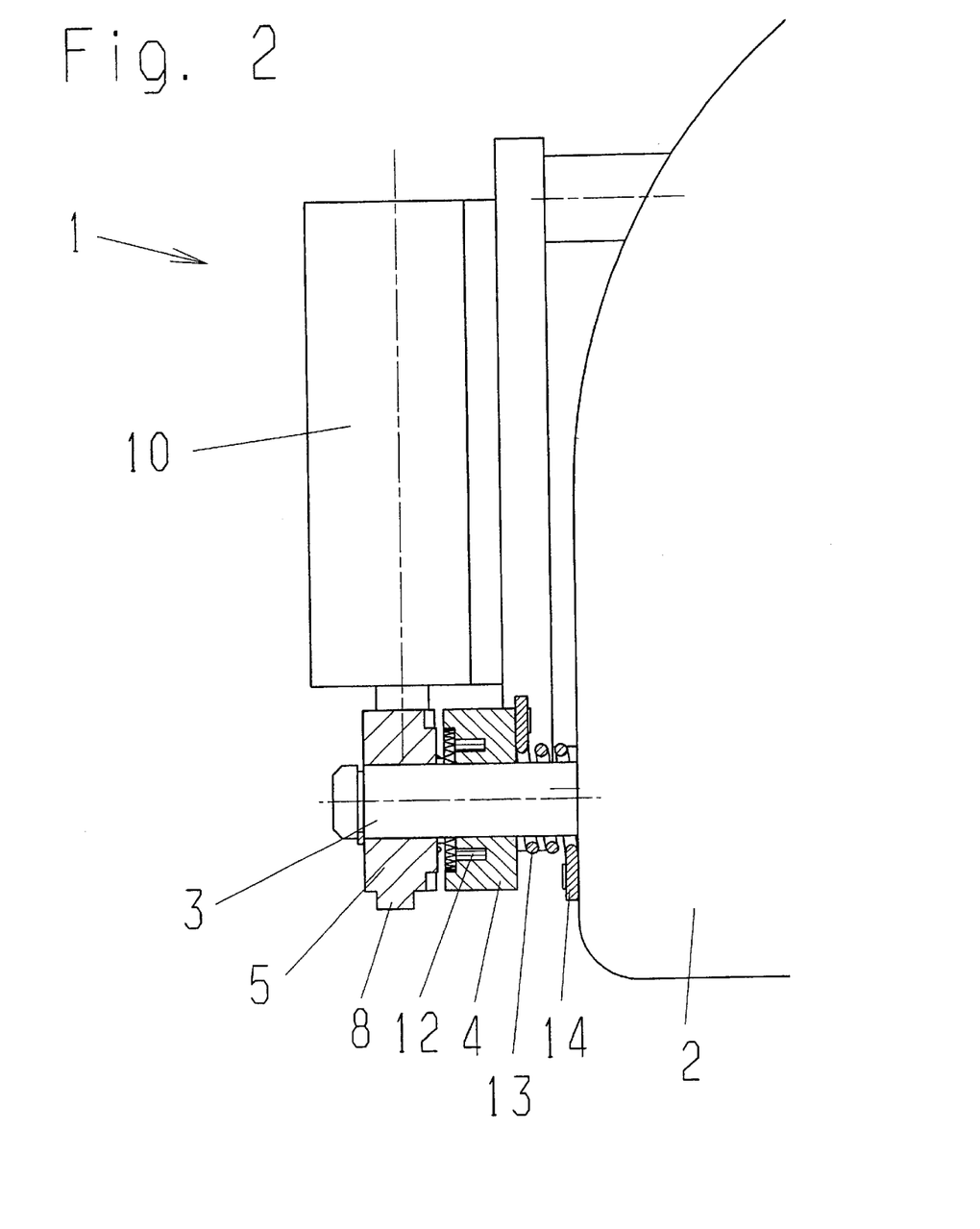
FIG. 2 is a sectional view of the device for shifting a mechanical shifting device according to FIG. 1.
Figure 3:
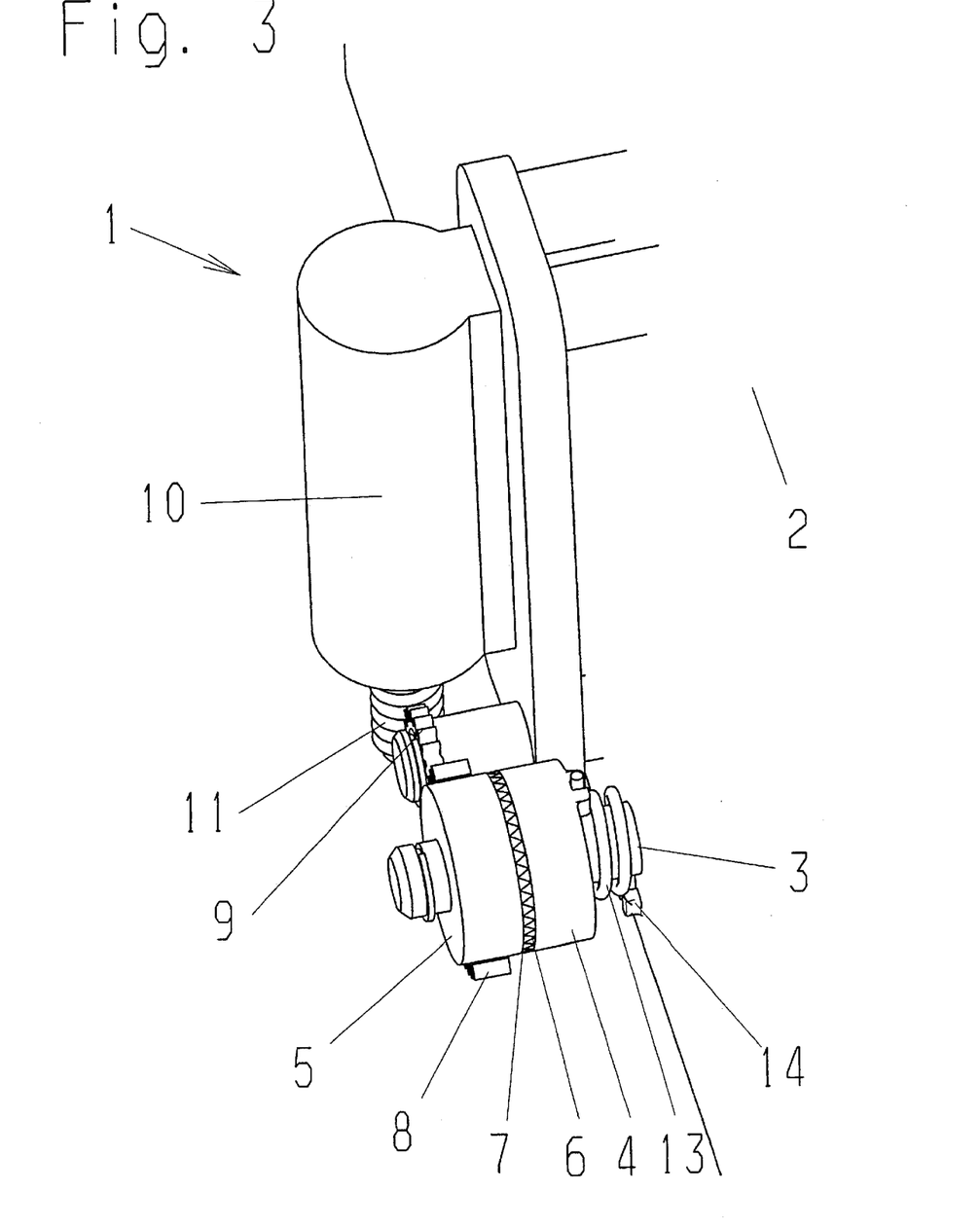
FIG. 3 is a perspective view of the device according to the present invention for shifting a mechanical shifting device according to the first embodiment in the coupled state.

Referring to the drawings in particular, FIGS. 1 through 3 show a first embodiment of the device according to the present invention for shifting a mechanical shifting means or shifter, which is designated as a whole by the reference number 1. The device I for shifting a mechanical shifting device is provided at an automatic transmission 2 and is used at least for shifting between the four modes of operation "P,", "R," "N" and "D." Shifting between the different modes of operation of the automatic transmission can be performed by rotating a shaft 3, and the shaft 3 can be rotated in a direction of rotation defined as a positive direction from an angular position of the shaft 3 that is associated with the mode of operation "P" in order to engage the other modes of operation "R," "N" and "D." The modes of operation "R," "N" and "D" correspond, in this order, to an increasing rotation of the shaft 3 in the positive direction of rotation.

An adjusting member 4, designed as the first toothed disk of a jaw clutch, is arranged concentrically to the shaft 3, rotating in unison with same. A control member 5, designed as the second toothed disk of the jaw clutch, is likewise mounted concentrically to the shaft 3, but with a snug fit, and a toothed ring 6, 7 concentric to the shaft is provided on the surfaces of the two toothed disk facing one another. The teeth of the toothed ring 6 arranged at the adjusting member 4 are offset from the adjusting member 4 in the direction of the control member 5. Furthermore, the teeth of the toothed ring 7 arranged at the control member 5 are offset from the control member 5 in the direction of the adjusting member 4. The toothed rings 6 and 7 have the same diameter and are designed such that the teeth of the toothed ring 6 arranged at the adjusting member 4 can engage the spaces between the teeth of the toothed ring 7 arranged at the control member 5 and vice versa, when the control member 5 is brought into contact with the adjusting member 4.

The geometric design of the individual teeth of the two toothed rings 6, 7 is such that by transmitting a torque from the control member 5 to the adjusting member 4 or vice versa, a releasing force is generated, which acts on the control member 5 and pushes same away from the adjusting member 4. If the releasing force is not opposed by a coupling force, which pushes the control member 5 toward the adjusting member 4, the control member 5 is carried by the adjusting member 4 to a position in which the teeth of the two toothed rings 6, 7 no longer engage one another if the releasing force is sufficiently strong. Consequently, without a coupling force, a connection rotating in unison is not present between the adjusting member 4 and the control member 5, which is characteristic of the uncoupled state. This is also true when the coupling force is present, but its amount is lower than that of the releasing force.

If, by contrast, the amount of the coupling force is greater than the amount of the releasing force, the adjusting member 4 and the control member 5 are in contact with one another. The two toothed rings 6, 7 engage one another and form a connection rotating in unison between the adjusting member 4 and the control member 5, which is characteristic of the coupled state.

The control member 5 has a row of teeth 8 on its circumference with radially directed teeth, which forms a part of an arc. This row of teeth 8 is engaged by a gear 9, which is engaged by a cylinder worm 11 driven by a motor 10. The cylinder worm 11 and the gear 9 form a worm gear with self-locking, via which the control member 5 can be driven or rotated by the motor 10. The motor 10, the cylinder worm 11 and the gear 9 form the drive device for driving the control member 5 in cooperation with the row of teeth 8.

An electromagnet 12 is provided in the adjusting member 4, and the control member 5 is made of a ferromagnetic material. In cooperation with the toothed rings 6, 7, the electromagnet 12 and the ferromagnetic material of the control member 5 form a coupling device, by means of which the adjusting member 4 and the control member 5 can be coupled with one another. If an electric current flows through the electromagnet, a magnetic field is built up, which magnetizes the ferromagnetic material and cooperates with same such that a force, which brings the control member 5 and the adjusting member 4 into contact with one another and holds them together, will act on the ferromagnetic material. As is apparent from FIG. 3, the two toothed rings 6, 7 now engage one another, as a result of which connection rotating in unison will be established between the adjusting member 4 and the control member 5. The adjusting member 4 and the control member 5 are thus in the coupled state, in which the coupling force induced by the magnets, through which current flows, in cooperation with the ferromagnetic material, is always stronger than the releasing force of the jaw clutch.

The shaft 3 can be rotated by the motor 10 in the coupled state, so that shifting is possible between the different modes of operation of the automatic transmission 2 by means of the motor 10. The motor 10 is actuated now by an electronic circuit, not shown, such that the mode of operation engaged in the automatic transmission 2 corresponds to the shift position of the gearshift lever in the cab of the vehicle. The shaft 3 can be rotated for this purpose by the motor 10 either in the positive or negative direction (clockwise or counterclockwise) of rotation.

A leg spring 13 is fastened with one end to the surface of the adjusting wheel or adjusting member 4 facing the automatic transmission 2. The other end of the leg spring is fastened to an abutment 14 provided at the automatic transmission 2.

The leg spring 13 is fastened between the adjusting member 4 and the abutment 14 such that it has its lowest tension, which is hereinafter called the pretension, in the mode of operation "P." To engage the modes of operation "R," "N" and "D," the shaft 3 is rotated via the adjusting member 4 in the positive direction of rotation, and the leg spring 13 is tensioned additionally beyond the pretension. The work necessary for the additional tensioning of the leg spring is generated by the motor 10 in the coupled state.

If a power failure occurs in the vehicle, the power supply for the electromagnet 12 also breaks down, and no coupling force acts on the control member 5 any longer. If the automatic transmission 2 is in a mode of operation other than the mode of operation "P," the torque transmitted by the tensioned leg spring to the adjusting member 4 causes the control member 5 to be moved away from the adjusting member because of the releasing force. The adjusting member 4 is then turned back by the leg spring 13 into the angular position corresponding to the mode of operation "P" because of the tension, as a result of which the automatic transmission 2 is shifted back via the shaft 3 into the mode of operation "P," in which the parking brake is engaged.

To ensure that the adjusting member 4 can also be turned back by the leg spring 13, a certain minimum tension of the leg spring 13 is necessary, which is called the resetting tension. The leg spring 13 has at least this resetting tension in each mode of operation different from "P" in order to reliably guarantee the engagement of the parking brake of the automatic transmission 2 in case of a power failure. It may be necessary for this reason to apply a certain minimum pretension to the leg spring 13 already in the angular position of the adjusting member 4 corresponding to the mode of operation "P." To ensure that the minimum pretension is not reduced when the jaw clutch is in the uncoupled state, e.g., a stop is provided at the automatic transmission 2, and a pin, which is in contact with the stop in the angular position of the adjusting member 4 associated with the mode of operation "P," is provided at the adjusting member 4. The pin and the stop cooperate such that the adjusting member 4 cannot be rotated farther in the negative direction of rotation in its angular position associated with the mode of operation "P." The minimum pretension is thus reliably prevented from decreasing.

Figure 4:
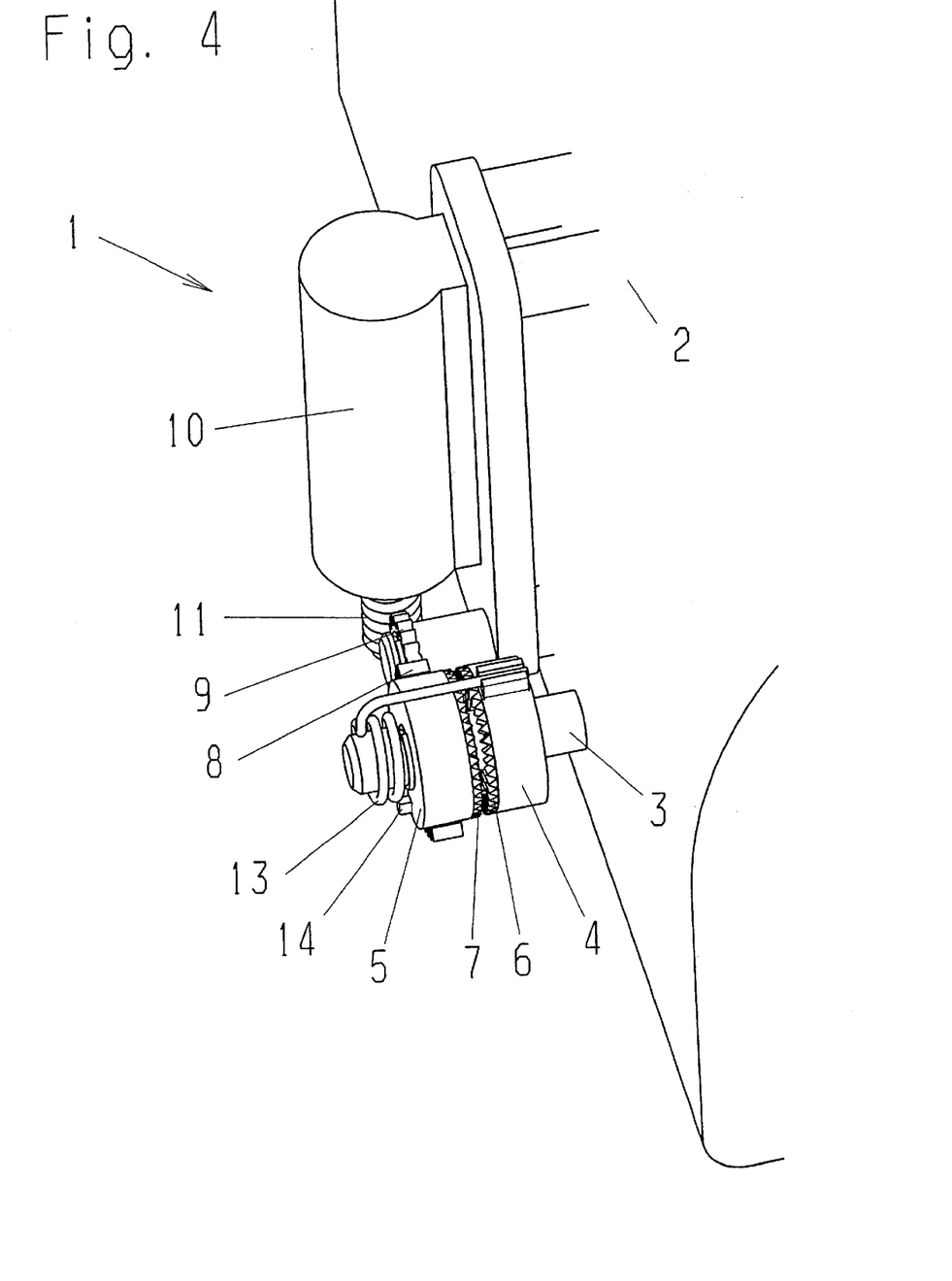
FIG. 4 is a perspective view of the device according to the present invention for shifting a mechanical shifting device according to a second embodiment in the uncoupled state.
Figure 5:
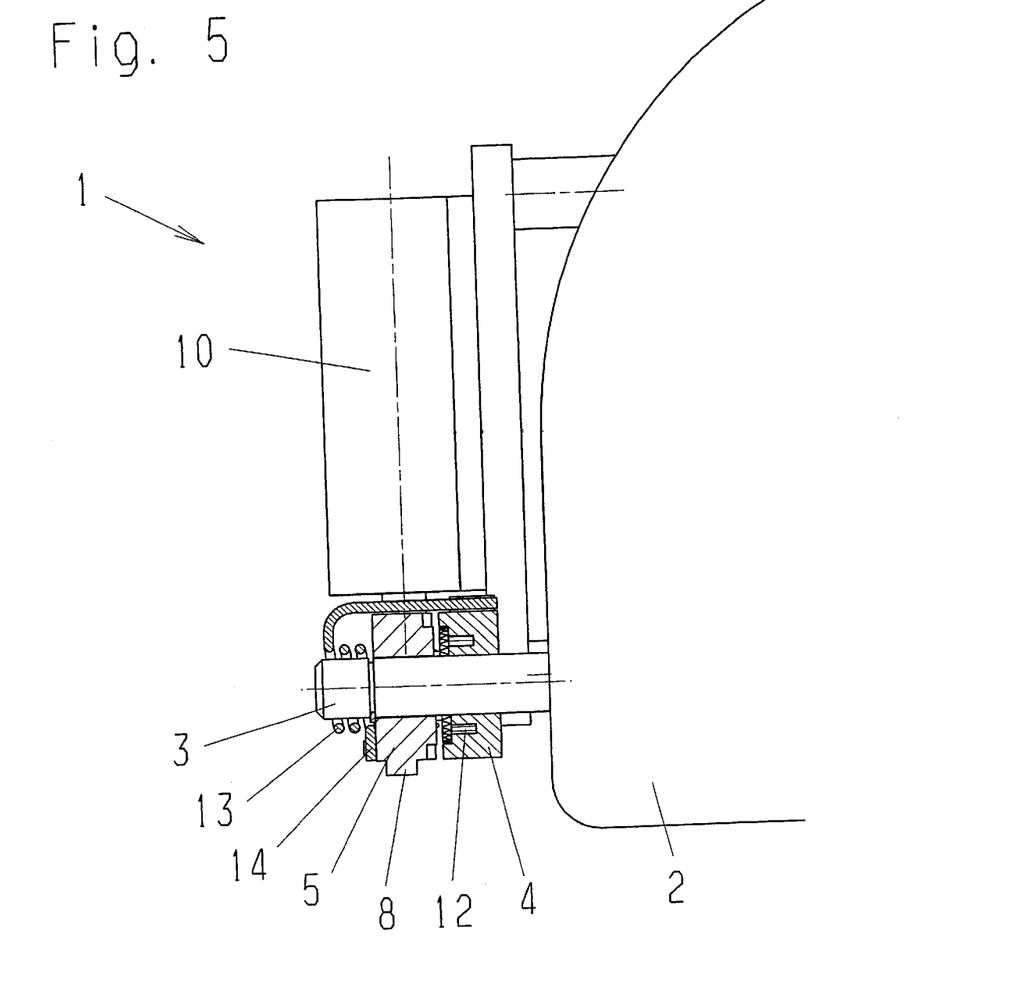
FIG. 5 is a sectional view of the device for shifting a mechanical shifting device according to FIG. 4.
Figure 6:
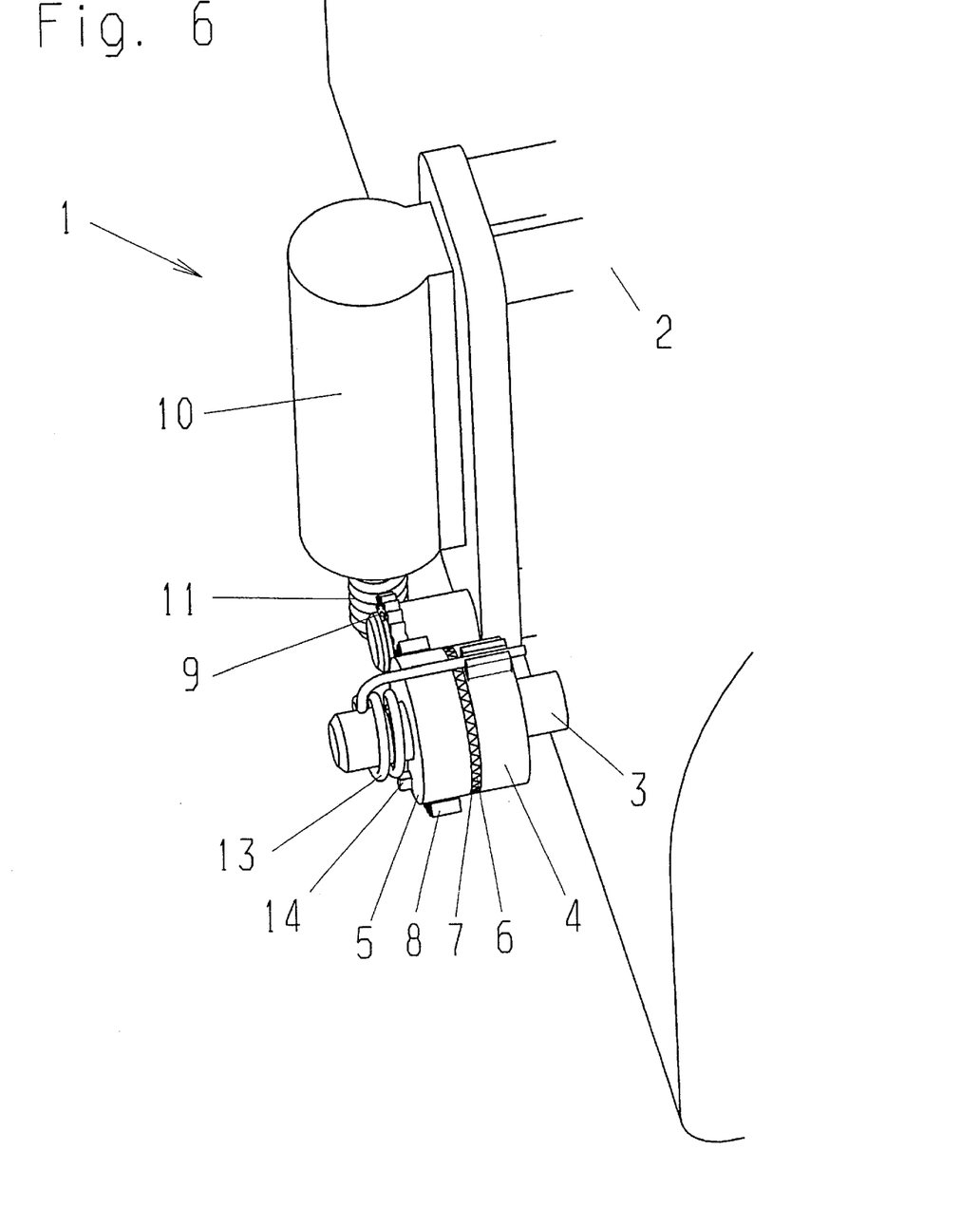
FIG. 6 is a perspective view of the device according to the present invention for shifting a mechanical shifting device according to the second embodiment in the coupled state.

FIGS. 4 through 6 show a second embodiment of the device according to the present invention for shifting a mechanical shifting device, in which the reference numbers used for the features according to the second embodiment correspond to the reference numbers used for the same or similar features according to the first embodiment.

The second embodiment is essentially identical in terms of design to the first embodiment with the exception of the arrangement of the leg spring 13 and of the abutment 14. However, the stop at the automatic transmission 2 and the pin at the adjusting member 4 may be eliminated according to the second embodiment.

As is apparent from FIGS. 4 through 6, the leg spring 13 is arranged between the adjusting member 4 and the control member 5 according to the second embodiment. The abutment 14 is provided now at the control member 5, so that the leg spring 13 is fastened with one of its ends at the adjusting member 4 and with its other end at the abutment 14 provided at the control member 5.

The leg spring 13 is fastened between the adjusting member 4 and the abutment 14 such that it has its lowest tension in the uncoupled state. For shifting between the modes of operation, the coupled state between the adjusting member 4 and the control member 5 must first be established, which is preferably performed in the shift position "P" of the automatic transmission 2. The control wheel or control member 5 is rotated for this purpose by the motor 10 in the positive direction of rotation until the tension of the leg spring 13 corresponds to the resetting tension, the resetting tension being defined in this case as the tension that is necessary to shift back the automatic transmission 2 into the mode of operation "P" from any mode of operation different from "P." The adjusting member 4 and the control member 5 are coupled with one another by means of the electromagnet 12 only when the tension of the leg spring 13 has reached the resetting tension. To prevent a possible rotation of the shaft 3 during the tensioning of the leg spring 13, the adjusting member 4 may be secured against rotation during the tensioning operation by means of a mechanism, by which the adjusting member 4 is again released after the tensioning operation. To engage the modes of operation "R," "N" and "D" from the mode of operation "P," the shaft 3 is then rotated by the motor 10 in the positive direction of rotation via the coupled jaw clutch, and the tension of the leg spring 13 is set constantly at the resetting tension for all modes of operation of the automatic transmission 2 as long as the coupled state is maintained.

Consequently, contrary to the first embodiment, no additional work needs to be performed by the motor 10 according to the second embodiment for tensioning the leg spring 13 for shifting between the modes of operation of the automatic transmission 2.

If a power failure occurs in the vehicle, the power supply for the electromagnet 12 also breaks down, and no coupling force acts on the control member 5 any longer. The torque transmitted to the adjusting member 4 by the leg spring 13 tensioned up to the resetting tension causes the control member 5 to be moved away from the adjusting member 4 because of the releasing force. The adjusting member 4 is subsequently rotated back into the angular position corresponding to the mode of operation "P" by the leg spring 13 because of its tension, as a result of which the automatic transmission 2 is shifted back at the same time via the shaft 3 into the mode of operation "P," in which the parking brake is engaged.

To ensure that the adjusting member 4 can also be rotated back by the leg spring 13, it is necessary to set the direction of rotation of the control member 5 in relation to the adjusting member 4 in the uncoupled state. This setting, which is not necessary in the first embodiment, is performed by the worm gear formed by the cylinder worm 11 and the gear 9, which has a sufficiently strong self-locking to prevent the control member 5 from rotating because of the spring tension of the leg spring 13.

While specific embodiments of the invention have been shown and described in detail to illustrate the application of the principles of the invention, it will be understood that the invention may be embodied otherwise without departing from such principles.

What is claimed is:

1. A device comprising:

a mechanical shifter for shifting between a first shifting state and at least one second shifting state, the shifter being part of a parking brake system of an automatic transmission and the first shifting state corresponding to the state of the engaged parking brake, and the second shifting state corresponding to the state of the disengaged parking brake;

an adjusting member coupled with said shifter for shifting between the shifting states;

a control member that is coupleable with said adjusting member;

a coupling device that is actuatable by an electric signal for coupling said adjusting member and said control member with one another, said coupling device uncoupling said adjusting member and said control member from one another in case of loss of the electric signal;

a drive driving said control member;

a spring shifting the shifter into the first shifting state and which is coupled with said adjusting member and with an abutment, the spring being tensioned in relation to said adjusting member in a second shifting state such that the shifter is shifted into the first shifting state by said spring means via said adjusting member in an uncoupled state.

2. A device in accordance with claim 1, wherein said adjusting member and said shifter are coupled with one another, said adjusting member being connected to a shaft rotating in unison, and said shifter being shifted between the first and second shifting states by a rotary movement of said shaft.

3. A device in accordance with claim 2, wherein said control member is mounted rotatably in relation to said shaft, and said adjusting member and said control member are connected to one another rotating in unison in a coupled state.

4. A device in accordance with claim 3, wherein said adjusting member and said control member cooperate to form a jaw clutch.

5. A device in accordance with claim 3, wherein said drive has a motor coupled via a worm gear with said control member for rotating same.

6. A device in accordance with claim 1, wherein said spring is one of a coil spring or a leg spring and is fastened with one end to said adjusting member and with the other end to said abutment.

7. A device in accordance with claim 1, wherein said abutment is arranged at said automatic transmission or at a fixed site relative to said automatic transmission.

8. A device in accordance with claim 1, wherein said abutment is arranged at said control member.

9. A device in accordance with claim 1, wherein said coupling device includes a magnetizable area each at both said adjusting member and said control member and at least one of the magnetizable areas is formed by an electromagnet that can be activated by the electric signal.

10. A device in accordance with claim 1, wherein said electric signal can be controlled by a control unit to create a signal state similar to a loss of the electric signal.

11. A transmission shifting device comprising:

a transmission;

a shifter extending from said transmission and shifting said transmission between first and second shifting states;

an adjusting member coupled with said shifter to have movement of said adjusting member shift said transmission between said shifting states;

a control member selectively connectable with said adjusting member;

a coupling device connecting said adjusting member to said control member upon receiving an electric signal, said coupling device disconnecting said adjusting member from said control member upon a loss of said electric signal;

a drive driving said control member;

a spring biasing said shifter to shift said transmission into said first shifting state when said control member and said adjusting member are disconnected by said coupling device.

12. A device in accordance with claim 11, wherein:

said spring has one end connected to said adjusting member and another end connected to an abutment on said transmission, said spring shifting said transmission into said first shifting state via said adjusting member.

13. A device in accordance with claim 11, wherein:

said spring has one end connected to said adjusting member and another end connected to an abutment at a fixed site relative to said transmission, said spring shifting said transmission into said first shifting state via said adjusting member.

14. A device in accordance with claim 11, wherein:

said spring has one end connected to said adjusting member and another end connected to an abutment on said control member, said spring shifting said transmission into said first shifting state via said adjusting member.

15. A device in accordance with claim 11, wherein:

said coupling device includes an electromagnet arranged in one of said adjusting member and said control member.

16. A device in accordance with claim 11, further comprising:

a jaw clutch arranged between said control member and said adjusting member for the selective connection of said control member and said adjusting member, said jaw clutch including teeth on said adjusting member and said control member, said teeth having a shape for generating a releasing force disconnecting said control member from said adjusting member when said control member is rotated with respect to said adjusting member.

17. A device in accordance with claim 16, wherein:

said coupling device overcomes said releasing force and connects said adjusting member to said control member upon receiving said electric signal.

18. A device in accordance with claim 11, wherein:

said spring applies a force between said control member and said adjusting member.

* * * * *